(No Model.)
A. W. DELANE.
FAUCET.
No. 464,276. Patented Dec. 1, 1891.
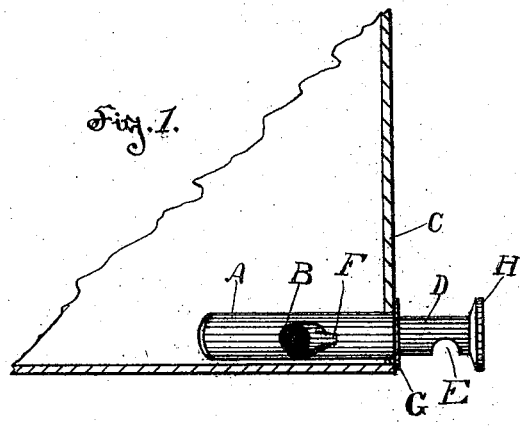
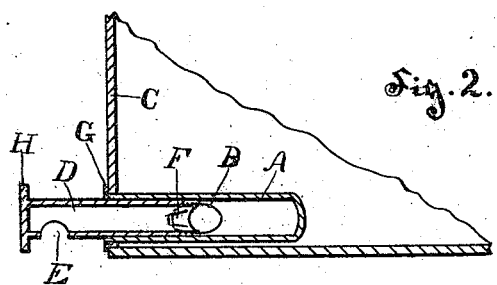
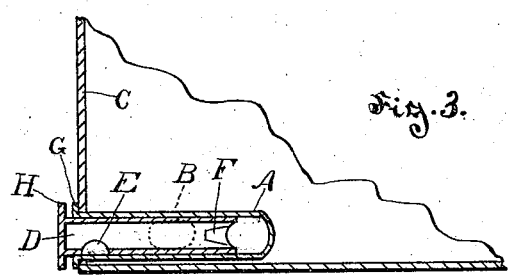
Witnesses.
Alfred I. Townsend
M. C. Galer.
Inventor:
Anson W. Delane
by Hazard Townsend
his atty.

UNITED STATES PATENT OFFICE.

ANSON W. DELANE, OF SAN DIEGO, ASSIGNOR OF ONE-HALF TO A. H. JUDSON, J. H. BURKS, AND A. G. HINCKLEY, ALL OF LOS ANGELES, CALIFORNIA.

FAUCET.

SPECIFICATION forming part of Letters Patent No. 464,276, dated December 1, 1891.

Application filed December 9, 1890. Serial No. 374,010. (No model.)

*To all whom it may concern:*

Be it known that I, ANSON W. DELANE, a citizen of the United States, residing at San Diego, in the county of San Diego and State of California, have invented a new and useful Improved Faucet, of which the following is a specification.

My invention relates to that class of faucets in which two tubes are arranged to telescope together to open or close a port through which the liquid flows.

The object of my invention is to reduce the cost of the faucet and increase its simplicity, efficiency, and convenience.

My improved faucet consists of two pieces—viz., an outer and an inner telescoping tube—each of which may be formed of pressed copper or other suitable material at a very slight cost, and then prepared with but little labor for combination with each other to form the faucet, as hereinafter set forth.

The accompanying drawings illustrate my invention.

Figure 1 is a sectional view of a vessel provided with my improved faucet adjusted to allow the passage of the liquid. Fig. 2 is a longitudinal mid-section of Fig. 1, viewed from the other side. Fig. 3 is a like view showing the tubes adjusted to close the passage through the faucet. Fig. 4 is a cross-section of the faucet at right angles to its axis, showing the oval form of the tubes.

The case or outer tube A is closed at its inner end, and is provided at its outer end (which is open to receive the inner tube D) with a plain flange G, by which the case A may be soldered to the wall C of the can or other vessel.

The case A is provided with the intermediate port B between the end of the case A and the wall C of the vessel.

The inner or telescoping tube D is open at its inner end and closed at its outer end, near which it is provided with the intermediate discharge-port E, arranged at a slight distance from the end of the tube to leave between the port and the closed outer end of the tube a portion of the wall of the tube intact to engage the case when the faucet is closed, and thus assist in preventing any flow of the oil or other liquid. The inner or open end of the telescoping tube is provided with a forward and laterally-projecting spring-tongue F, which is formed of the side wall of the tube D, and is arranged in line with the port B to spring outward through such port and engage the margin thereof when the tube D is pulled out to open such port. The spring-tongue thus serves as a catch to prevent the complete withdrawal of the telescoping tube.

The tube D is provided with a flange H, which serves as a handle or catch by which it can be drawn out. When the tube D is pushed into the case to close the faucet, the spring tongue or catch F is pressed flush with the side of the tube D and the wall of the tube closes the side port B, while the discharge-port E becomes closed by the bottom of the case A, thus perfectly closing the faucet. The tubes are oval in cross-section and fit each other exactly, thus preventing the inner tube from turning to disarrange the faucet. If the tubes were made circular in cross-section, the inner tube would be liable to turn, thus bringing the discharge-port E to the side or top of the faucet instead of at the bottom, as shown, and the spring-tongue catch F would be brought out of alignment with the port B, thus allowing the inner tube to be withdrawn and destroying the efficiency of the faucet.

By means of the construction shown I avoid the necessity of any packing between the tubes, and the manufacture of my improved faucet consists, simply, of the formation of the two tubes, which, with their flanges, may be pressed by suitable dies into proper form, the ports and spring-catch being then formed by suitable machinery at a minimum cost. When the tubes are thus completed, the faucet is finished by the simple insertion of the telescoping tube into the case.

Now having described my invention, what I claim as new, and desire to secure by Letters Patent, is—

1. The combination of the case A, provided with the intermediate port B, and the telescoping tube D, provided with the spring-tongue F, arranged in line with the intermediate port B to engage the margin thereof.

2. The combination of the case A, oval in cross-section and provided with the intermediate port B, and the telescoping tube D, oval in cross-section and provided with the spring-tongue, arranged in line with the intermediate port B to engage the margin thereof.

ANSON W. DELANE.

Witnesses:
JAMES R. TOWNSEND,
H. S. UTLEY,
WM. H. HOLCOMB.